(12) United States Patent
Kanda et al.

(10) Patent No.: US 11,440,367 B2
(45) Date of Patent: Sep. 13, 2022

(54) ELECTRIC SUSPENSION DEVICE

(71) Applicant: HONDA MOTOR CO., LTD., Tokyo (JP)

(72) Inventors: Ryoma Kanda, Wako (JP); Yuya Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/205,372

(22) Filed: Mar. 18, 2021

(65) Prior Publication Data

US 2021/0291606 A1    Sep. 23, 2021

(30) Foreign Application Priority Data

Mar. 19, 2020 (JP) .............................. JP2020-048907

(51) Int. Cl.
*B60G 17/016*    (2006.01)

(52) U.S. Cl.
CPC ...... *B60G 17/016* (2013.01); *B60G 2400/208* (2013.01); *B60G 2400/25* (2013.01)

(58) Field of Classification Search
None
See application file for complete search history.

(56) References Cited

U.S. PATENT DOCUMENTS

| | | | |
|---|---|---|---|
| 2015/0066295 A1 | 3/2015 | Kanda et al. | |
| 2015/0081170 A1* | 3/2015 | Kikuchi | B60G 17/06 701/37 |
| 2015/0290995 A1 | 10/2015 | Kanda et al. | |
| 2016/0107498 A1* | 4/2016 | Yamazaki | B60G 17/0164 701/37 |

(Continued)

FOREIGN PATENT DOCUMENTS

| | | |
|---|---|---|
| CN | 104395116 A | 3/2015 |
| CN | 108730404 A | 11/2018 |

(Continued)

OTHER PUBLICATIONS

Office Action received in corresponding Japanese application No. 2020-048907 dated Aug. 31, 2021 with English translation (6 pages).

(Continued)

*Primary Examiner* — Navid Z. Mehdizadeh
(74) *Attorney, Agent, or Firm* — Rankin, Hill & Clark LLP

(57) ABSTRACT

Provided is an electric suspension device including an electromagnetic actuator that is provided between a body and wheel of a vehicle and generates damping force for damping vibration of the body. It includes: an information acquisition unit that acquires information on a wheel speed and a sprung speed of the vehicle; an estimation unit that estimates a stroke speed of the actuator based on the wheel speed; a determination unit that determines whether a wheel slip has occurred; and an orientation control unit that performs orientation control of the vehicle based on the sprung speed and the estimated stroke speed. When a wheel slip occurs, the orientation control unit performs orientation control of the vehicle based on a fixed stroke speed whose direction is the same as a direction of the sprung speed and whose magnitude is set at a predetermined fixed value, instead of the estimated stroke speed.

7 Claims, 7 Drawing Sheets

(56) References Cited

U.S. PATENT DOCUMENTS

| | | |
|---|---|---|
| 2018/0297434 A1 | 10/2018 | Ohno et al. |
| 2018/0361814 A1* | 12/2018 | Ohno ................. B60G 17/0152 |
| 2018/0361816 A1 | 12/2018 | Ohno et al. |

FOREIGN PATENT DOCUMENTS

| | | |
|---|---|---|
| JP | 2015-047906 A | 3/2015 |
| JP | 2016-022830 A | 2/2016 |
| JP | 2019-001369 A | 1/2019 |

OTHER PUBLICATIONS

Office Action received in corresponding CN application No. 202110269622.4 dated Mar. 2, 2022 with English translation (11 pages).

\* cited by examiner

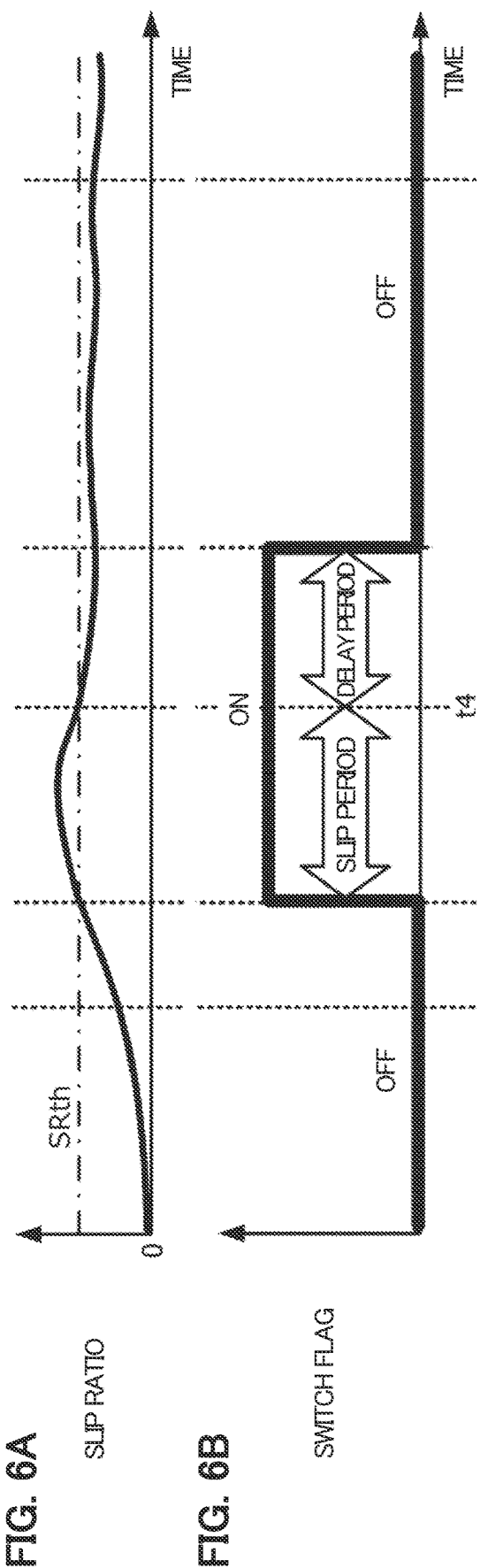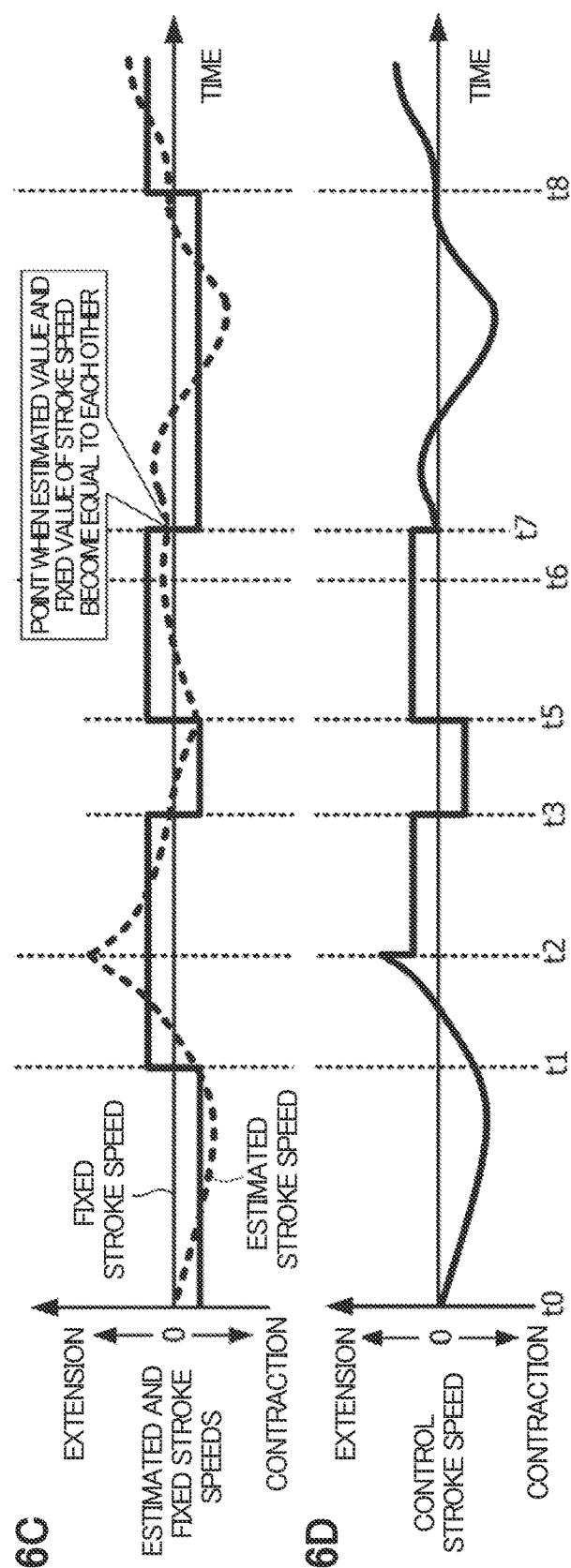

ELECTRIC SUSPENSION DEVICE

CROSS-REFERENCE TO RELATED APPLICATION

This application is based upon and claims priority from the Japanese Patent Application No. 2020-048907, filed on Mar. 19, 2020, the entire contents of which are incorporated herein by reference.

BACKGROUND OF THE INVENTION

1. Field of the Invention

The present invention relates an electric suspension device including an actuator that is provided between a body and a wheel of a vehicle and generates damping force for damping vibration of the body.

2. Description of the Related Art

An electric suspension device has heretofore been known which includes an actuator that is provided between a body and a wheel of a vehicle and generates damping force for damping vibration of the body (see Japanese Patent Application Publication No. 2015-47906).

The electric suspension device disclosed in Japanese Patent Application Publication No. 2015-47906 includes: a basic input amount calculation unit that calculates a basic input amount of the vehicle based on an amount of change in wheel speed detected by a wheel speed sensor; a first target current setting unit that sets a first target current based on the basic input amount; a second target current setting unit that sets a second target current based on an acceleration of the body of the vehicle detected by an acceleration sensor; and a control unit that controls a damper (actuator) based on the first target current when a vehicle behavior control device that controls behavior of the vehicle is not operating, and controls the damper based on the second target current when the vehicle behavior control device is operating.

The electric suspension device disclosed in Japanese Patent Application Publication No. 2015-47906 can appropriately control the damping force of the actuator regardless of the caster angle at which the suspension is set and without using vertical G sensors or stroke sensors.

SUMMARY OF THE INVENTION

Meanwhile, in the electric suspension device disclosed in Japanese Patent Application Publication No. 2015-47906, the sprung speed and the stroke speed are calculated based on the wheel speed, as illustrated and described in FIG. 4 and paragraph 0051 of Japanese Patent Application Publication No. 2015-47906.

Also, in the electric suspension device disclosed in Japanese Patent Application Publication No. 2015-47906, a skyhook control unit calculates a skyhook control target current to be given to each actuator by referring to a current map in which relations of the values of skyhook target damping forces with changes in stroke speed are each associated with a different control target current, based on a skyhook target damping force and the stroke speed, as illustrated and described in FIG. 12 and paragraph 0080 of Japanese Patent Application Publication No. 2015-47906.

In sum, in the electric suspension device disclosed in Japanese Patent Application Publication No. 2015-47906, the stroke speed, which serves as a base in the calculation of the skyhook control target current, is calculated based on the wheel speed. Thus, in a situation where the behavior of the vehicle becomes unstable (when VSA, ABS, or TCS operates), a slip of its wheel occurs, so that the wheel speed cannot be acquired and therefore the stroke speed cannot be acquired either.

For this reason, in a situation where the behavior of the vehicle becomes unstable, the electric suspension device disclosed in Japanese Patent Application Publication No. 2015-47906 stops skyhook control (which uses the skyhook control target current calculated based on the stroke speed) and performs damping force control with pitch control and roll control (which do not use the stroke speed), as described in paragraph 0098 of Japanese Patent Application Publication No. 2015-47906.

However, in the case where the electric suspension device disclosed in Japanese Patent Application Publication No. 2015-47906 stops the skyhook control and performs the damping force control with the pitch control and the roll control in a situation where the behavior of the vehicle becomes unstable, the skyhook control is not performed and therefore the ride quality of the vehicle is impaired accordingly.

Thus, the electric suspension device disclosed in Japanese Patent Application Publication No. 2015-47906 still has room for improvement in maintaining the ride quality of a vehicle comfortable even in a situation where the behavior of the vehicle becomes unstable.

The present invention has been made in view of the above circumstance and an object thereof is to provide an electric suspension device capable of maintaining the ride quality of a vehicle comfortable even in a situation where the behavior of the vehicle becomes unstable.

In order to achieve to the above object, an electric suspension device according to the present invention (1) is an electric suspension device including an actuator that is provided between a body and a wheel of a vehicle and generates damping force for damping vibration of the body. The main feature of the electric suspension device is that it includes: an information acquisition unit that acquires information on each of a wheel speed and a sprung speed of the vehicle; an estimation unit that estimates a stroke speed of the actuator based on the wheel speed; a determination unit that determines whether a slip of the wheel has occurred; and an orientation control unit that performs orientation control of the vehicle based on the sprung speed and the estimated stroke speed, in a case where the determination unit determines that a slip of the wheel has occurred, the orientation control unit performs orientation control of the vehicle based on a fixed stroke speed whose direction is the same as a direction of the sprung speed and whose magnitude is set at a predetermined fixed value, instead of the estimated stroke speed.

According to the electric suspension device according to the present invention (1), it is possible to maintain the ride quality of a vehicle comfortable even in a situation where the behavior of the vehicle becomes unstable, such as when a slip of its wheel occurs.

BRIEF DESCRIPTION OF THE DRAWINGS

FIGS. 6A to 6D are time charts to be used to describe operation of the electric suspension device according to an embodiment of the present invention.

DETAILED DESCRIPTION OF THE EMBODIMENTS

Figure 1:
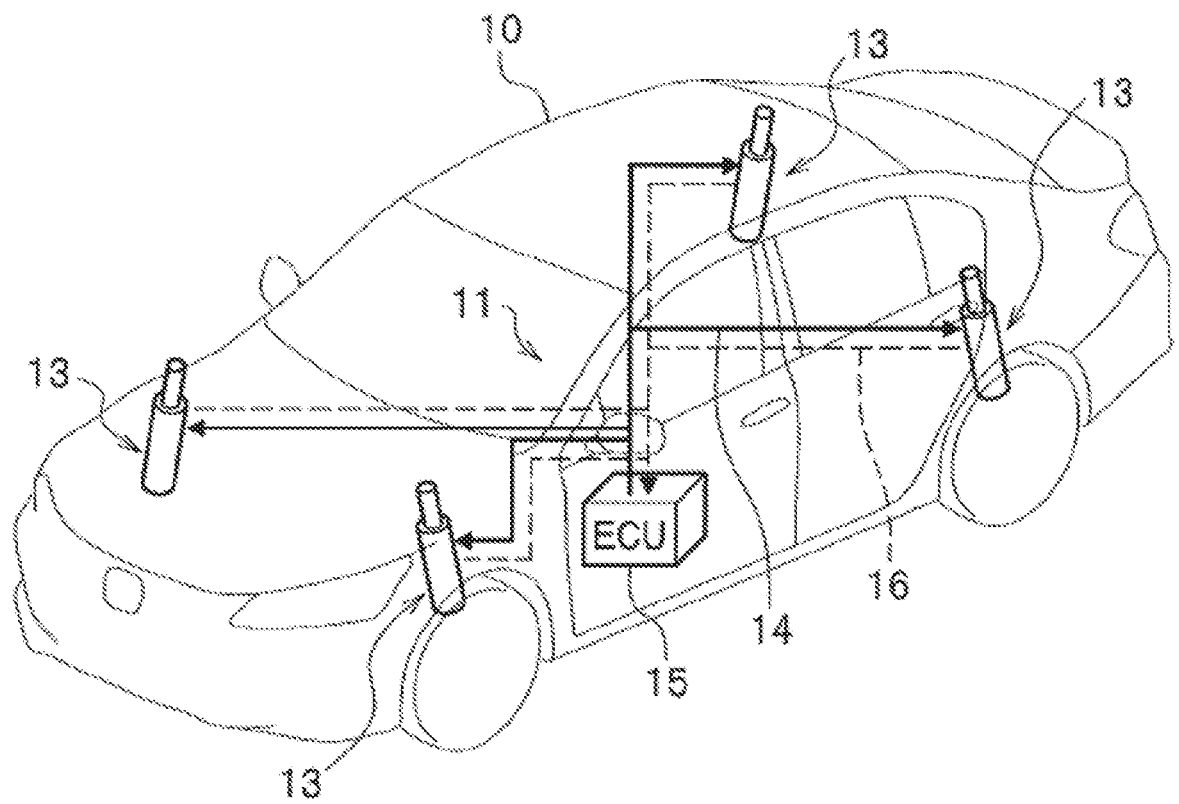
FIG. 1 is a diagram of an entire configuration of electric suspension devices according to embodiments of the present invention.

Electric suspension devices 11 according to embodiments of the present invention will be described in detail below with reference the drawings as appropriate.

Note that, in the drawings be presented below, members having the same function are denoted by the same reference sign. In this case, as a general rule, a redundant description will be omitted. Moreover, the sizes and shapes of the members may be changed or exaggerated and schematically illustrated for convenience of explanation.

[Basic Configuration Common to Electric Suspension Devices 11 According to Embodiments of The Present Invention]

Firstly, a basic configuration common to the electric suspension devices 11 according to the embodiments of the present invention will be described with reference to FIGS. 1 and 2.

FIG. 1 is a diagram of an entire configuration common to the electric suspension devices 11 according to the embodiments of the present invention. FIG. 2 is a partially cross-sectional view of an electromagnetic actuator 13 forming a part of the electric suspension devices 11.

As illustrated in FIG. 1, the electric suspension device 11 according to the embodiments of the present invention includes a plurality of electromagnetic actuators 13 each provided for a wheel of a vehicle 10, and a load control ECU 15. The plurality of electromagnetic actuators 13 and the load control ECU 15 are connected to each other by respective power supply lines 14 (see the solid lines in FIG. 1) for supplying driving control power from the load control ECU 15 to the plurality of electromagnetic actuators 13 and respective signal lines 16 (see the broken lines in FIG. 1) for sending driving control signals for electric motors 31 (see FIG. 2) from the plurality of electromagnetic actuators 13 to the load control ECU 15.

In the present embodiments, a total of four electromagnetic actuators 13 are disposed, each for one of the front wheels (front left wheel and front right wheel) and the rear wheels (rear left wheel and rear right wheel). The driving of the electromagnetic actuators 13 provided for the respective wheels is controlled independently of each other for extension-contraction operations at the wheels.

In the embodiments of the present invention, the plurality of electromagnetic actuators 13 have a common configuration unless otherwise noted. Thus, the configuration of one electromagnetic actuator 13 will be described as a description of the plurality of electromagnetic actuators 13.

Figure 2:
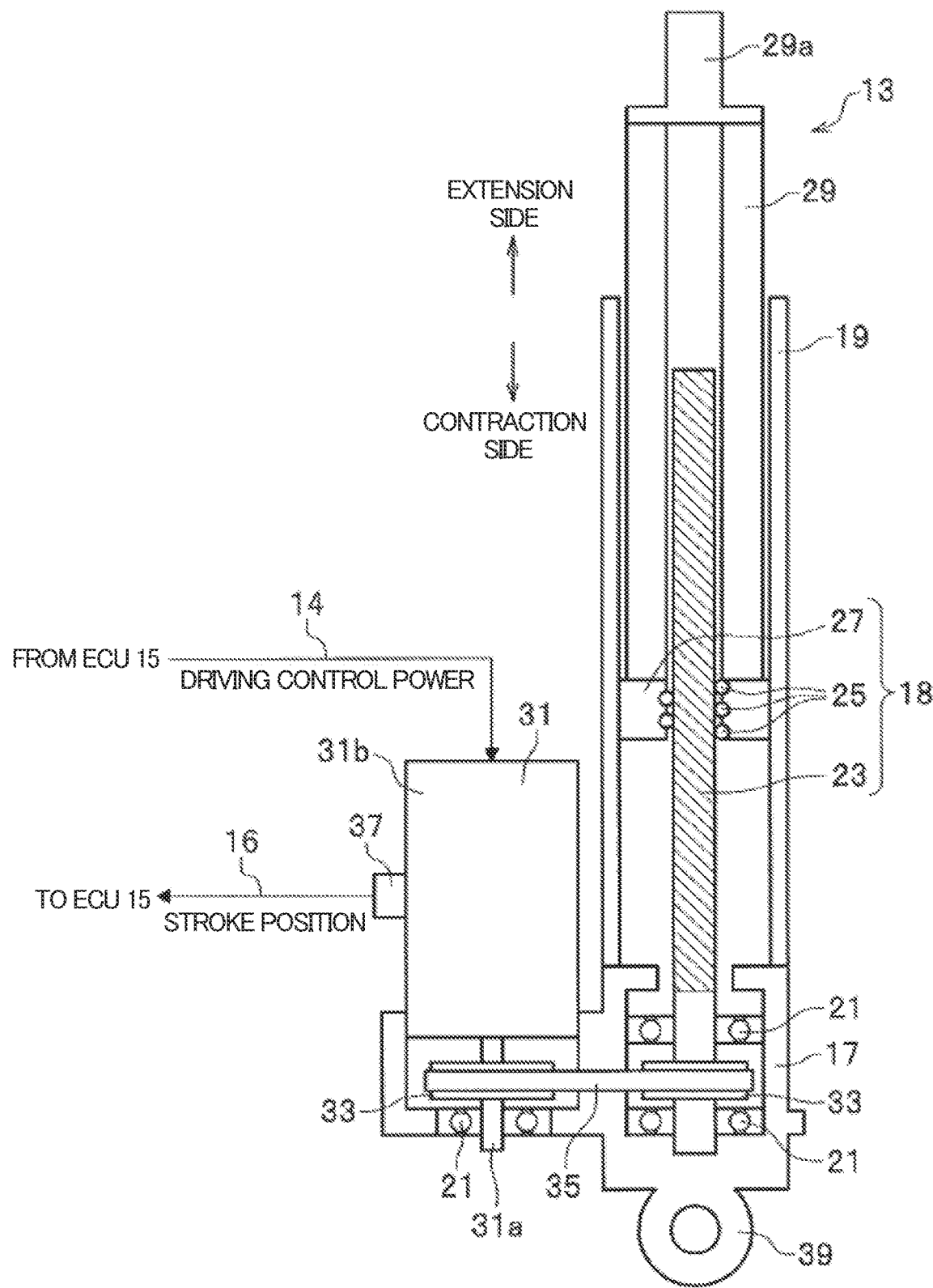
FIG. 2 is a partially cross-sectional view of an electromagnetic actuator included in the electric suspension devices according to the embodiments of the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports the proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove on the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves in the axial direction of the outer tube 19 together with the nut 27.

In order to transmit rotational driving force to the ball screw shaft 23, the electromagnetic actuator 13 includes an electric motor 31, a pair of pulleys 33, and a belt member 35, as illustrated in FIG. 2. The electric motor 31 is provided on the base housing 17 in parallel to the outer tube 19. The pulleys 33 are mounted on a motor shaft 31a of the electric motor 31 and the ball screw shaft 23, respectively. Around these pair of pulleys 33 is stretched the belt member 35 for transmitting the rotational driving force of the electric motor 31 to the ball screw shaft 23.

The electric motor 31 is provided with a resolver 37 that detects a rotational angle signal from the electric motor 31. The rotational angle signal from the electric motor 31 detected by the resolver 37 is sent to the load control ECU 15 via the signal line 16. The rotational driving of the electric motor 31 is controlled according to the driving control power supplied from the load control ECU 15 to each of the plurality of the electromagnetic actuators 13 via the corresponding power supply line 14.

Note that the present embodiments employ the layout in which the motor shaft 31a of the electric motor 31 and the ball screw shaft 23 are disposed substantially parallel to each other and coupled to each other, as illustrated in FIG. 2, to shorten the axial dimension of the electromagnetic actuator 13. Alternatively, a layout may be employed in which the motor shaft 31a of the electric motor 31 and the ball screw shaft 23 are disposed coaxially with each other and coupled to each other.

As illustrated in FIG. 2, the electromagnetic actuators 13 according to the embodiments of the present invention are provided with a coupling portion 39 at a lower end portion of the base housing 17. This coupling portion 39 is coupled and fixed to an unsprung member not illustrated (such as the lower arm or the knuckle on the wheel side). On the other hand, an upper end portion 29a of the inner tube 29 is coupled and fixed to a sprung member not illustrated (such as a strut tower portion on the body side).

In short, the electromagnetic actuator 13 is provided in parallel to a spring member not illustrated provided between the body and the wheel of the vehicle 10.

The electromagnetic actuator 13 configured as above operates as below. Specifically, consider a case where, for example, a thrust related to upward vibration is inputted into the coupling portion 39 from the wheel side of the vehicle 10. In this case, the inner tube 29 and the nut 27 try to descend together relative to the outer tube 19 receiving the thrust related to the upward vibration. In response to this, the ball screw shaft 23 tries to rotate in the direction corresponding to the descent of the nut 27. At this moment, the electric motor 31 is caused to generate a rotational driving force in the direction in which the rotational driving force impede the descent of the nut 27. This rotational driving force of the electric motor 31 is transmitted to the ball screw shaft 23 via the belt member 35.

By exerting a reaction force (damping force) on the ball screw shaft 23 against the thrust related to the upward vibration in this manner, the vibration trying to be transmitted from the wheel side to the body side is damped.

[Internal Configuration of Load Control ECU 15]

Next, configurations inside and around the load control ECU 15 included in the electric suspension device 11 according to an embodiment of the present invention will be described with reference to FIG. 3.

Figure 3:
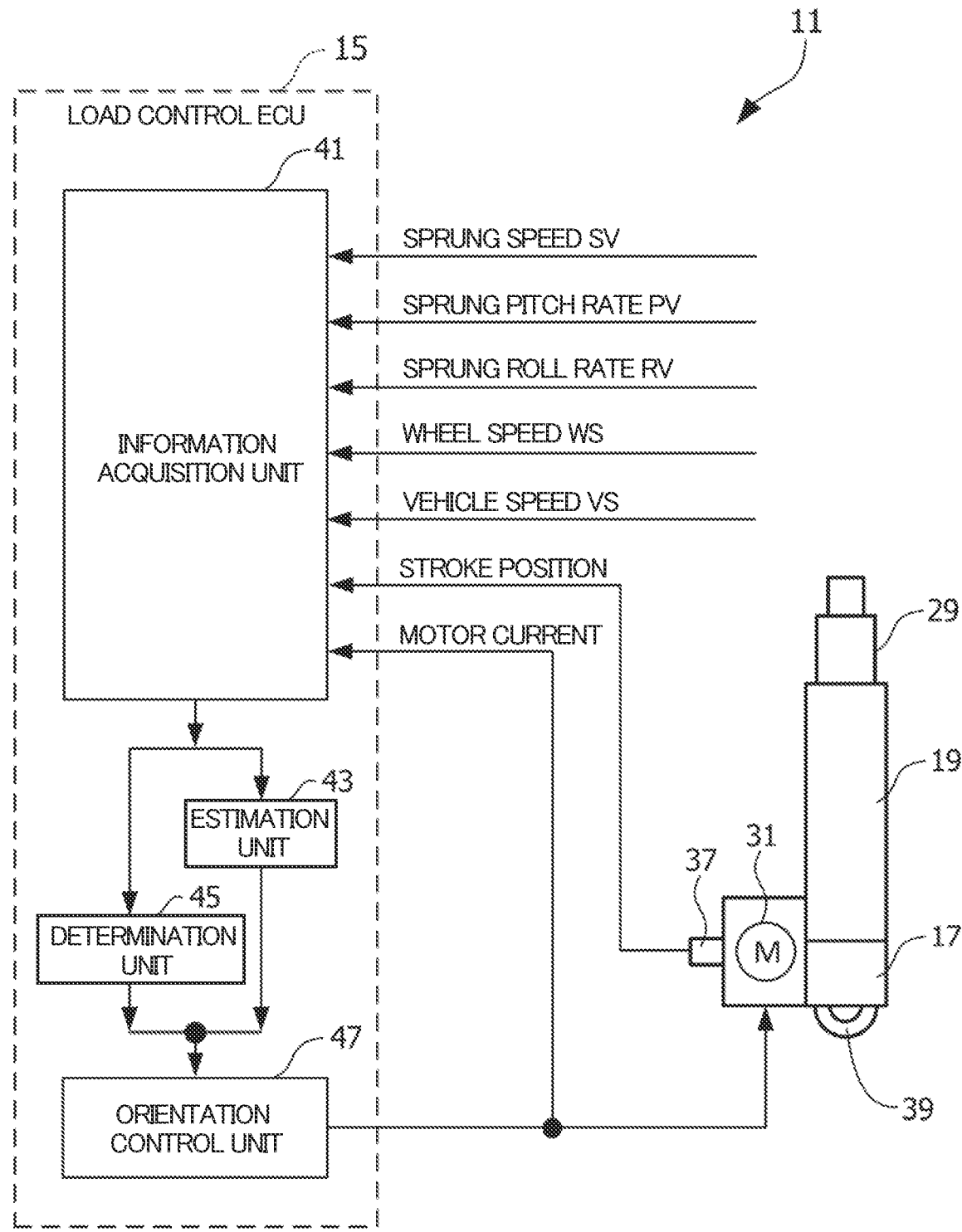
FIG. 3 is a diagram of configurations inside and around a load control ECU included in the electric suspension device according to an embodiment of the present invention.

FIG. 3 is a diagram of the configurations inside and around the load control ECU 15 included in the electric suspension device 11 according to the embodiment of the present invention.

[Electric Suspension Device 11 According to Embodiment of the Present Invention]

The load control ECU 15 included in the electric suspension device 11 according to the embodiment of the present invention includes a microcomputer that performs various arithmetic processes. The load control ECU 15 has a driving control function of controlling the driving of each of the plurality of electromagnetic actuators 13 based on the rotational angle signal from the electric motor 31 detected by the resolver 37, target loads TL, and so on to thereby generate a driving force for a damping operation and an extension-contraction operation of the electromagnetic actuator 13.

In order to implement this driving control function, the load control ECU 15 includes an information acquisition unit 41, an estimation unit 43, a determination unit 45, and an orientation control unit 47, as illustrated in FIG. 3.

As illustrated in FIG. 3, the information acquisition unit 41 acquires the rotational angle signal from the electric motor 31 detected by the resolver 37 as time-series information on the stroke position. Further, the information acquisition unit 41 acquires information on a sprung speed SV by time-integrating time-series information on a vertical acceleration obtained by a 3D gyro provided in the vehicle 10. Note that the sprung speed SV is the speed of the sprung mass (body) in the vertical direction.

As illustrated in FIG. 3, the information acquisition unit 41 also acquires time-series information on each of a sprung pitch rate PV, a sprung roll rate RV, and a wheel speed WS.

The information on the sprung pitch rate PV and the sprung roll rate RV may be acquired by, for example, a gyro sensor (not illustrated) provided in the vehicle 10.

The information on the wheel speed WS may be acquired by, for example, a wheel speed sensor (not illustrated) provided for each wheel of the vehicle 10.

Also, based on the obtained information on the sprung speed SV, the information acquisition unit 41 acquires information indicating toward which one of the extension side and the contraction side the direction of the sprung speed SV is oriented.

As illustrated in FIG. 3, the information acquisition unit 41 further acquires time-series information on each of a vehicle speed VS, the stroke position of the electromagnetic actuator 13, and a motor current for the electric motor 31.

The pieces of information on the sprung speed SV, the sprung pitch rate PV, the sprung roll rate RV, the wheel speed WS, the direction of the sprung speed SV, the vehicle speed VS, the stroke position of the electromagnetic actuator 13, and the motor current for the electric motor 31 acquired by the information acquisition unit 41 are sent to the estimation unit 43, the determination unit 45, and the orientation control unit 47.

As illustrated in FIG. 3, the estimation unit 43 has a function of estimating a stroke speed STS of the electromagnetic actuator based on the wheel speed WS acquired by the information acquisition unit 41. For the estimation of the stroke speed STS of the electromagnetic actuator 13 based on the wheel speed WS, a technical feature described as "the quantity-of-state calculating unit 31 belonging to the vehicle quantity-of-state estimation unit 22 estimates, for each wheel, various types of quantity of states (including the stroke speed STS) of the automobile V using vehicle modes, based on the detection values of the wheel speed sensor 9" in Japanese Patent Application Publication No. 2015-047906 may be referred to, for example.

The estimated value of the stroke speed STS obtained by the estimation unit 43 (the value of an estimated stroke speed STS_ES) is sent to the orientation control unit 47.

The determination unit 45 has a function of making a slip determination as to whether a slip of the wheel of the vehicle 10 has occurred. Specifically, the determination unit 45 calculates a slip ratio SR based on the difference between the vehicle speed VS and the wheel speed WS. The slip ratio SR may be calculated by dividing the result of subtraction of the wheel speed WS from the vehicle speed VS (=VS−WS) by the vehicle speed VS.

Incidentally, the wheel speed WS is zero with respect to the vehicle speed VS in a case where the vehicle body slips with the wheel locked. Thus, the slip ratio SR is (1).

When the slip ratio SR exceeds a predetermined slip threshold value SRth, the determination unit 45 determines that a slip of the wheel has occurred. On the other hand, when the slip ratio SR falls to or below or is at or below the slip threshold value SRth, the determination unit 45 determines that a slip of the wheel has stopped (has remained stopped or has not occurred).

The result of the determination by the determination unit 45 (whether a slip of the wheel has occurred or stopped) is sent to the orientation control unit 47.

The orientation control unit 47 basically calculates a skyhook (hereinafter "skyhook" will also be abbreviated as "SH") target load (target damping force) based on the sprung speed SV and the estimated stroke speed STS_ES estimated by the estimation unit 43, and performs orientation control of the vehicle 10 based on the calculated SH target load (target damping force). Specifically, in the case where the determination unit 45 determines that a slip of the wheel has occurred, the orientation control unit 47 calculates an SH target load (target damping force) based on a fixed stroke speed STS_FX whose direction is the same as the direction of the sprung speed SV and which is set at a predetermined fixed value (described later in detail), instead of the estimated stroke speed STS_ES, and performs orientation control of the vehicle 10 based on the calculated SH target load (target damping force).

The orientation control by the orientation control unit 47 will be described later in detail.

The orientation control unit 47 calculates a target current value (SH control current value) with which the calculated SH target load (target damping force) can be achieved. The orientation control unit 47 then controls the driving of the electric motor 31 included in each of the plurality of electromagnetic actuators 13 such that the motor current for the electric motor 31 follows the target current value calculated. The driving of the electric motors 31 of the plurality of electromagnetic actuators 13 is controlled independently of each other.

Note that the orientation control unit 47 can preferably use, for example, an inverter control circuit when generating the driving control power to be supplied to each electric motor 31. [Configuration of Main Part of Load Control ECU 15 Included in Electric Suspension Device 11]

Next, a configuration of a main part of the load control ECU 15 included in the electric suspension device 11 according to an embodiment of the present invention will be described with reference to FIGS. 4A and 4B.

Figure 4A:
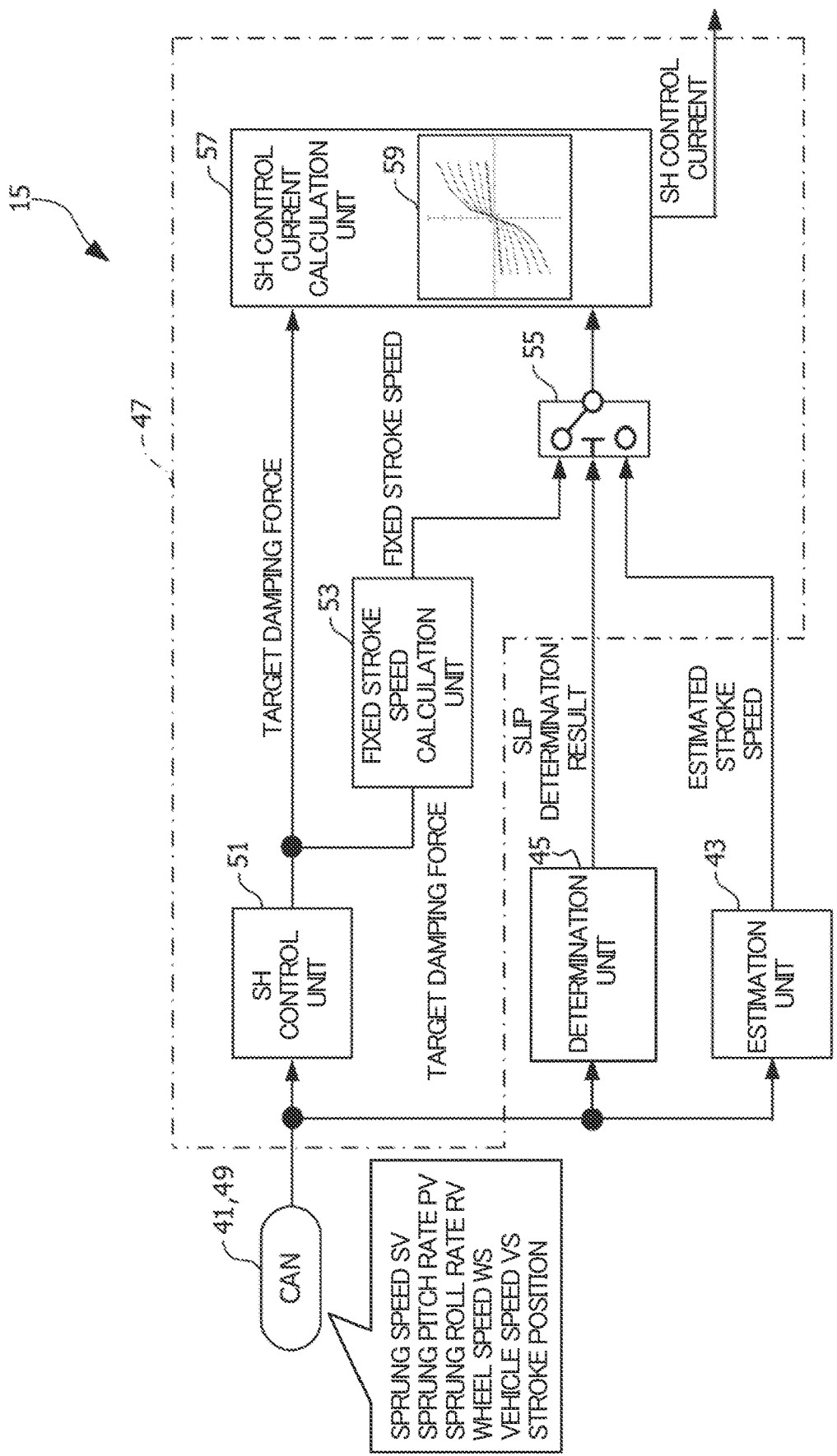
FIG. 4A is a diagram conceptually illustrating an internal configuration of the load control ECU included in the electric suspension device according to an embodiment of the present invention.

FIG. 4A is a diagram conceptually illustrating the configuration of the main part of the load control ECU 15 included in the electric suspension device 11 according to the embodiment of the present invention. FIG. 4B is an explanatory diagram of a stroke speed STS-target damping force map 59 conceptually indicating relations of the damping force with the stroke speed STS by using skyhook control current values (SH control current values) as parameters.

The load control ECU 15 included in the electric suspension device 11 further includes an SH control unit 51, a fixed stroke speed calculation unit 53, a selection unit 55, and an SH control current calculation unit 57, in addition to the estimation unit 43 and the determination unit 45 described above.

The SH control unit 51 has a function of calculating an SH target load (hereinafter "SH target load" will also be referred to as "target damping force") that can suppress vibration of the vehicle 10, for example, when wheels of the vehicle 10 run over a dent or a bump on a road to improve the ride quality.

When calculating the target damping force, the SH control unit 51 refers to the information on the sprung speed SV acquired via a controller area network (CAN) 41 and a sprung speed SV-target damping force map (not illustrated) as appropriate. The sprung speed SV-target damping force map is a table in which the values of target damping forces are associated with changes in the sprung speed SV.

Information on the target damping force calculated by the SH control unit 51 is sent to the SH control current calculation unit 57.

The fixed stroke speed calculation unit 53 has a function of calculating the fixed stroke speed STS_FX. The fixed stroke speed STS_FX is a stroke speed STS referred to, instead of the estimated stroke speed, when the SH control current value is calculated in the case where the determination unit 45 determines that a slip of the wheel has occurred.

There are two things to be considered when the fixed stroke speed STS_FX is calculated. The first one is its direction, and the second one is its magnitude. With respect to these points, in the electric suspension device 11 according to the embodiment of the present invention, the direction of the fixed stroke speed STS_FX is set at the same direction as the direction of the sprung speed SV. Also, the magnitude of the fixed stroke speed STS_FX is set at a predetermined fixed value.

The fixed value of the fixed stroke speed STS_FX may be set at an appropriate value while ensuring that an effect of naturally suppressing vehicle body vibration without a sense of strangeness is achieved when damping force control is performed using the target damping force calculated based on the stroke speed STS.

The fixed value of the fixed stroke speed STS_FX may be set at, for example, the magnitude of the stroke speed STS immediately before the determination unit 45 determines that the slip of the wheel has occurred.

The fixed stroke speed STS_FX calculated by the fixed stroke speed calculation unit 53 is sent to the SH control current calculation unit 57.

The selection unit 55 has a first control mode in which the orientation control of the vehicle 10 based on the estimated stroke speed STS_ES is performed and a second control mode in which the orientation control of the vehicle 10 based on the fixed stroke speed STS_FX is performed, as control modes for controlling the orientation of the vehicle 10.

Between the first control mode and the second control mode, the selection unit 55 selects the latter, or the second control mode (in which the orientation control of the vehicle 10 based on the fixed stroke speed STS_FX is performed), as the control mode for the vehicle 10 in the case where the determination unit 45 makes a slip determination that a slip of the wheel has occurred.

On the other hand, between the first control mode and the second control mode, the selection unit 55 selects the former, or the first control mode (in which the orientation control of the vehicle 10 based on the estimated stroke speed STS_ES is performed), as the control mode for the vehicle 10 when the determination unit 45 makes a slip determination that a slip of the wheel has stopped (or has remained stopped).

The control mode selection information selected by the selection unit 55 (indicating which stroke speed STS to use between the estimated value and the fixed value) is sent to the SH control current calculation unit 57.

The SH control current calculation unit 57 has a function of calculating an SH control current based on the information on the target damping force calculated by the SH control unit 51, the control mode selection information selected by the selection unit 55, and the stroke speed STS-target damping force map 59.

When calculating the SH control current, the SH control current calculation unit 57 refers to the stroke speed STS-target damping force map 59 and performs a reverse lookup with the information on the target damping force and the information on the stroke speed STS, which is an estimated value or a fixed value, to calculate a suitable SH control current among the values of the SH control current parameters.

Each of the SH control unit 51, the fixed stroke speed calculation unit 53, the selection unit 55, and the SH control current calculation unit 57 described above is a constituent element belonging to the "orientation control unit 47".

[Operation of Electric Suspension Device 11]

Figure 5:
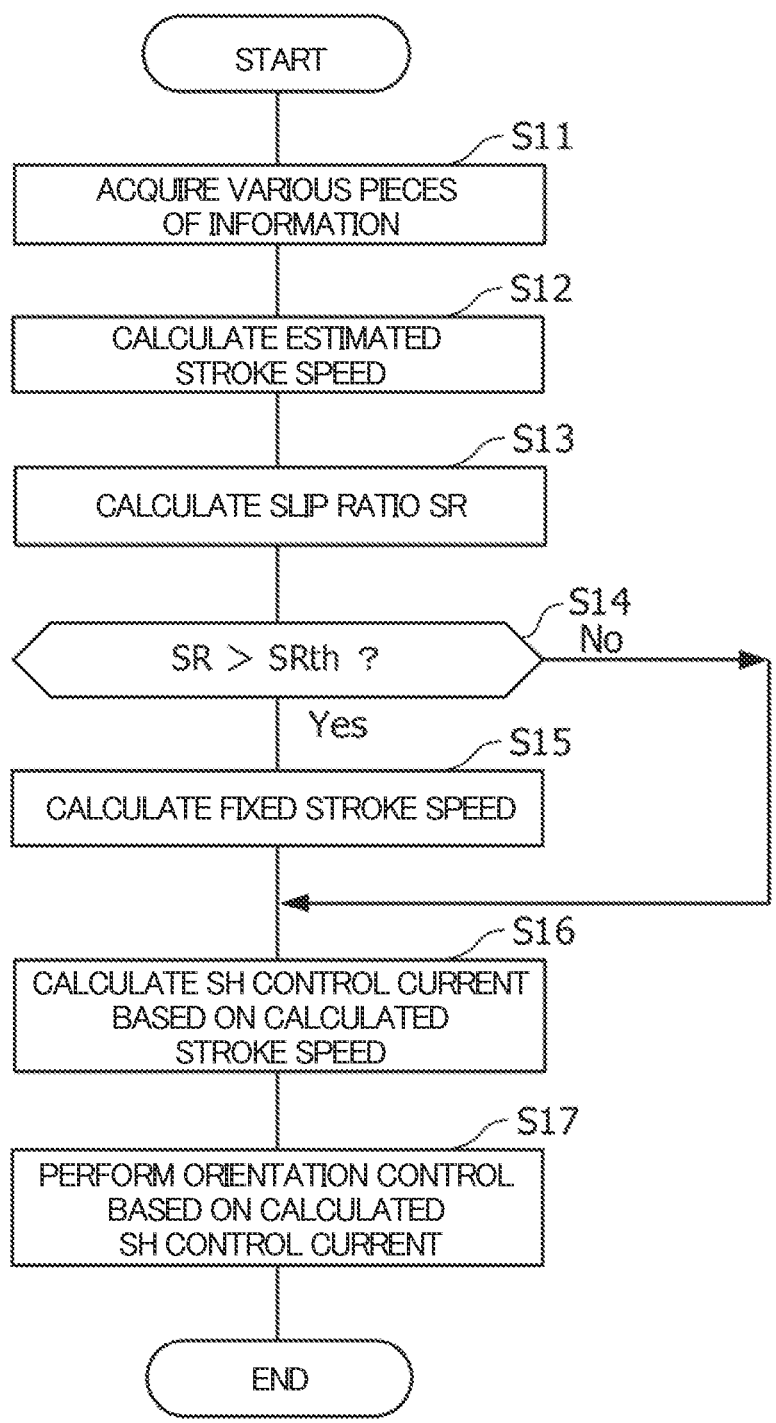
FIG. 5 is a flowchart to be used to describe operation of the electric suspension device according to an embodiment of the present invention.

Next, operation of the electric suspension device 11 according to an embodiment of the present invention will be described with reference to FIG. 5. FIG. 5 is a flowchart to be used to describe the operation of the electric suspension device 11 according to the embodiment of the present invention.

In step S11 illustrated in FIG. 5, the information acquisition unit 41 of the load control ECU 15 acquires the rotational angle signal from each electric motor 31 detected by the resolver 37 as time-series information on the stroke position and acquires information on the sprung speed SV by time-differentiating the time-series information on the stroke position.

Further, the information acquisition unit 41 acquires information on the sprung pitch rate PV, the sprung roll rate RV, the wheel speed WS, and the direction of the sprung speed SV.

Furthermore, the information acquisition unit 41 acquires information on the vehicle speed VS, the stroke position of the electromagnetic actuator 13, and the motor current for the electric motor 31.

The pieces of information on the sprung speed SV, the sprung pitch rate PV, the sprung roll rate RV, the wheel speed WS, the direction of the sprung speed SV, the vehicle speed VS, the stroke position of the electromagnetic actuator 13, and the motor current for the electric motor 31 acquired by the information acquisition unit 41 are sent to the estimation unit 43 and the determination unit 45.

In step S12, the estimation unit 43 of the load control ECU 15 estimates the stroke speed STS of the electromagnetic actuator based on the wheel speed WS acquired by the information acquisition unit 41.

In step S13, the determination unit 45 of the load control ECU 15 calculates the slip ratio SR based on the difference between the vehicle speed VS and the wheel speed WS.

In step S14, the determination unit 45 of the load control ECU 15 makes a slip determination as to whether the slip ratio SR calculated in step S13 has exceeded the predetermined slip threshold value SRth, that is, whether a slip of the wheel has occurred.

If the result of the slip determination made in step S14 indicates that a slip of the wheel has occurred, the load control ECU 15 causes the process flow to advance to the next step S15.

If, on the other hand, the result of the slip determination made in step S14 indicates that a slip of the wheel has not occurred, the load control ECU 15 causes the process flow to jump to step S16.

In step S15, the fixed stroke speed calculation unit 53 belonging to the orientation control unit 47 of the load control ECU 15 calculates the fixed stroke speed STS_FX based on the direction of the sprung speed SV and the above-mentioned fixed value, which has been set in advance.

In step S16, the SH control current calculation unit 57 belonging to the orientation control unit 47 of the load control ECU 15 calculates an SH control current based on the stroke speed STS calculated in step S12 or S15.

In step S17, the orientation control unit 47 of the load control ECU 15 performs orientation control of the vehicle 10 based on the SH control current calculated in step S16.

[Time-Series Operation of Electric Suspension Device 11]

Next, time-series operation of the electric suspension device 11 according to an embodiment of the present invention will be described with reference to FIGS. 6A to 6D. FIGS. 6A to 6D are time charts to be used to describe the operation of the electric suspension device 11 according to the embodiment of the present invention. FIG. 6A illustrates time-series changes in the slip ratio SR. FIG. 6B illustrates time-series changes in a switch flag. FIG. 6C illustrates time-series changes in each of the estimated and fixed stroke speeds STS. FIG. 6D illustrates time-series changes in a controlled stroke speed STS_CT.

The values (a) to (d) from a time t0 to a time t1 in FIGS. 6A to 6D shift as follows.

The slip ratio SR (a) is lower than the slip threshold value SRth. The switch flag (b) is in an OFF state. The estimated stroke speed STS_ES (c) is on the contraction side, gently shifting mostly in the contraction direction. The fixed stroke speed STS_FX (c) takes a fixed value in the contraction direction. The controlled stroke speed STS_CT (d) exhibits the same characteristic as the characteristic of the estimated stroke speed STS_ES.

The values (a) to (d) from the time t1 to a time t2 in FIGS. 6A to 6D shift as follows.

The slip ratio SR (a) is equal to or lower than the slip threshold value SRth. The switch flag (b) is in the OFF state. The estimated stroke speed STS_ES (c) is mostly on the extension side, increasing in the extension direction. The fixed stroke speed STS_FX (c) inverts from the contraction direction from the time t0 to the time t1 and takes a fixed value in the extension direction. The controlled stroke speed STS_CT (d) exhibits the same characteristic as the characteristic of the estimated stroke speed STS_ES.

The values (a) to (d) from the time t2 to a time t4 in FIGS. 6A to 6D shift as follows.

The slip ratio SR (a) exceeds the slip threshold value SRth. The switch flag (b) transitions from the ON state from the time t0 to the time t2 to an ON state. The ON period of the switch flag from the time t2 to the time t4 corresponds to a slip period in which a slip of the wheel is assumed to have occurred.

From the time t2 to the time t3 in the period from the time t2 to the time t4, the estimated stroke speed STS_ES (c) is on the extension side, shifting in the contraction direction. The fixed stroke speed STS_FX (c) maintains the extension direction from the time t1 to the time t2 and takes the fixed value in the extension direction. The characteristic of the controlled stroke speed STS_CT (d) switches from the characteristic of the estimated stroke speed STS_ES from the time t0 to the time t2 to the characteristic of the fixed stroke speed STS_FX.

From the time t3 to a time t5 across the time t4, the estimated stroke speed STS_ES (c) is on the contraction side, shifting in the contraction direction. The fixed stroke speed STS_FX (c) inverts from the extension direction from the time t2 to the time t3 and takes the fixed value in the contraction direction. The controlled stroke speed STS_CT (d) exhibits the same characteristic as the characteristic of the fixed stroke speed STS_FX.

The values (a) to (d) from the time t4 to a time t6 in FIGS. 6A to 6D shift as follows.

The slip ratio SR (a) becomes equal to or lower than the slip threshold value SRth at the time t4, and thereafter maintains this state. The switch flag (b) maintains the ON state from the time t2 to the time t4. The ON period of the switch flag from the time t4 to the time t6 corresponds to a predetermined delay time starting from the point (time t4) of transitioning from the state where the slip of the wheel has occurred to a state where the slip of the wheel has stopped.

From the time t5 to the time t6 in the period from the time t4 to the time t6, the estimated stroke speed STS_ES (c) shifts in the extension direction from the contraction side to the extension side. The fixed stroke speed STS_FX (c) inverts from the contraction direction from the time t3 to the time t5 and takes the fixed value in the extension direction. The controlled stroke speed STS_CT (d) exhibits the same characteristic as the characteristic of the fixed stroke speed STS_FX.

The values (a) to (d) from the time t6 to a time t8 in FIGS. 6A to 6D shift as follows.

The slip ratio SR (a) maintains a state of being lower than the slip threshold value SRth. The switch flag (b) transitions from the ON state to the OFF state at the time t6, and thereafter maintains the OFF state.

At the time t7 in the period from the time t6 to the time t8, the estimated stroke speed STS_ES (c) is on the extension side, shifting in the neutral direction. The fixed stroke speed STS_FX (c) transitions so as to abruptly drop from the fixed value in the extension direction to the fixed value in the contraction direction. In the transition at the time t7, the estimated value and the fixed value of the stroke speed STS become equal to each other. The characteristic of the controlled stroke speed STS_CT (d) switches from the characteristic of the fixed stroke speed STS_FX to the characteristic of the estimated stroke speed STS_ES at the time t7, at which the estimated value and the fixed value of the stroke speed STS become equal to each other.

From immediately after the time t7 to the time t8 in the period from the time t6 to the time t8, the estimated stroke speed STS_ES (c) is on the extension side and the contraction side, gently shifting mostly in the extension direction and the contraction direction. The fixed stroke speed STS_FX (c) takes the fixed value in the contraction direction. The controlled stroke speed STS_CT (d) exhibits the same characteristic as the characteristic of the estimated stroke speed STS_ES.

[Operation and Advantageous Effects of Electric Suspension Devices 11 According to Embodiments of the Present Invention]

An electric suspension device 11 based on a first aspect is, as a premise, an electric suspension device 11 including an actuator (electromagnetic actuator 13) that is provided between a body and a wheel of a vehicle 10 and generates damping force for damping vibration of the body.

The electric suspension device 11 based on the first aspect includes: an information acquisition unit 41 that acquires information on each of a wheel speed WS and a sprung speed SV of the vehicle 10; an estimation unit 43 that estimates a stroke speed of the electromagnetic actuator 13 based on the wheel speed WS; a determination unit 45 that determines whether a slip of the wheel has occurred; and an orientation control unit 47 that performs orientation control of the vehicle 10 based on the sprung speed SV and the estimated stroke speed STS_ES.

The orientation control unit 47 is configured such that, in a case where the determination unit 45 determines that a slip of the wheel has occurred, the orientation control unit 47 performs orientation control of the vehicle 10 based on a fixed stroke speed STS_FX whose direction is the same as a direction of the sprung speed SV and whose magnitude is set at a predetermined fixed value, instead of the estimated stroke speed STS_ES.

In the electric suspension device 11 based on the first aspect, the information acquisition unit 41 acquires the information on each of the wheel speed WS and the sprung speed SV of the vehicle 10. The estimation unit 43 estimates the stroke speed STS of the electromagnetic actuator 13 based on the wheel speed WS. The determination unit 45 determines whether a slip of the wheel has occurred. The orientation control unit 47 performs the orientation control of the vehicle 10 based on the sprung speed SV and the estimated stroke speed STS_ES (skyhook control; the same applies below).

Here, when a slip of the wheel occurs, it difficult is to acquire the accurate value of the wheel speed WS. This also leads to inclusion of an error in the stroke speed STS estimated based on the wheel speed WS. Consequently, the accuracy of the orientation control of the vehicle 10 performed based on the estimated stroke speed STS_ES, that is, the ride quality of the vehicle 10, is impaired as well.

To solve this, in the electric suspension device 11 based on the first aspect, the orientation control unit 47 is configured such that, in a case where the determination unit 45 determines that a slip of the wheel has occurred, the orientation control unit 47 performs the orientation control of the vehicle 10 based on the fixed stroke speed STS_FX, whose direction is the same as the direction of the sprung speed SV and whose magnitude is set at the predetermined fixed value, instead of the estimated stroke speed STS_ES.

According to the electric suspension device 11 based on the first aspect, in a case where the determination unit 45 determines that a slip of the wheel has occurred, the orientation control unit 47 performs the orientation control of the vehicle 10 based on the fixed stroke speed STS_FX, whose direction is the same as the direction of the sprung speed SV and whose magnitude is set at the predetermined fixed value, instead of the estimated stroke speed STS_ES. Thus, the electric suspension device 11 based on the first aspect can maintain the ride quality of the vehicle 10 comfortable even in a situation where the behavior of the vehicle 10 becomes unstable, such as when a slip of the wheel occurs.

Also, the direction of the fixed stroke speed STS_FX is the same as the direction of the sprung speed SV and the magnitude of the fixed stroke speed STS_FX is set at the predetermined fixed value. Thus, with the orientation control based on the fixed stroke speed STS_FX by the orientation control unit 47, the electric suspension device 11 based on the first aspect can make the ride quality of the vehicle 10 comfortable as if performing orientation control based on the sprung speed SV.

Also, an electric suspension device 11 based on a second aspect is the electric suspension device 11 based on the first aspect, and may be configured such that the fixed value of the fixed stroke speed STS_FX is set at a magnitude of a stroke speed STS immediately before the determination unit 45 determines that the slip of the wheel has occurred.

In the electric suspension device 11 based on the second aspect, the fixed value of the fixed stroke speed STS_FX is set at the magnitude of the stroke speed STS immediately before the determination unit 45 determines that the slip of the wheel has occurred. As a result, an orientation control force of a magnitude close to that of an orientation control force based on the stroke speed STS immediately before the determination unit 45 determines that the slip of the wheel has occurred is exerted on the vehicle 10.

According to the electric suspension device 11 based on the second aspect, an orientation control force of a magnitude close to that of the orientation control force based on the stroke speed STS immediately before the determination unit 45 determines that the slip of the wheel has occurred is exerted on the vehicle 10. Thus, the electric suspension device 11 based on the second aspect can make the ride quality of the vehicle 10 more natural with a less sense of strangeness than the ride quality provided by the electric suspension device 11 based on the first aspect.

Also, an electric suspension device 11 based on a third aspect is the electric suspension device 11 based on the second aspect, and may be configured such that in a case where the direction of the sprung speed SV inverts to a direction different from the direction of the fixed stroke speed STS_FX while the orientation control unit 47 is performing the orientation control of the vehicle 10 based on the fixed stroke speed STS_FX, the orientation control unit 47 performs orientation control of the vehicle 10 based on a fixed stroke speed STS_FX whose direction is the same as the inverted direction and whose magnitude is set at the magnitude of the stroke speed STS immediately before the determination unit 45 determines that the slip of the wheel has occurred.

According to the electric suspension device 11 based on the third aspect, in a case where the direction of the sprung speed SV inverts to a direction different from the direction of the fixed stroke speed STS_FX while the orientation control unit 47 is performing the orientation control of the vehicle 10 based on the fixed stroke speed STS_FX, the orientation control unit 47 performs the orientation control of the vehicle 10 based on the fixed stroke speed STS_FX whose direction is the same as the inverted direction and whose magnitude is set at the magnitude of the stroke speed STS immediately before the determination unit 45 determines that the slip of the wheel has occurred. This makes it possible to perform orientation control based on the same direction as the direction of the sprung speed SV. Thus, the electric suspension device 11 based on the third aspect can make the ride quality of the vehicle 10 more comfortable than the ride quality provided by the electric suspension device 11 based on the second aspect.

Also, an electric suspension device 11 based on a fourth aspect is the electric suspension devices 11 based on the first to third aspects, and may be configured such that the orientation control unit 47 has a first control mode in which the orientation control unit 47 performs the orientation control of the vehicle 10 based on the estimated stroke speed STS_ES and a second control mode in which the orientation control unit 47 performs the orientation control of the vehicle 10 based on the fixed stroke speed STS_FX, the orientation control unit 47 includes a switch flag that indicates, with a binary value, a state indicating whether to execute the first control mode or to execute the second control mode, the switch flag has such an ON-OFF characteristic that, in a case where the determination unit 45 determines that a slip of the wheel has occurred, the switch flag is turned on at a point when the determination is made, and is turned off after an elapse of a predetermined delay time from a point when the determination unit 45 determines that the slip of the wheel has stopped, and the orientation control unit 47 performs the orientation control of the vehicle 10 based on the fixed stroke speed STS_FX according to the ON-OFF characteristic of the switch flag.

According to the electric suspension device 11 based on the fourth aspect, the orientation control unit 47 performs the orientation control of the vehicle 10 based on the fixed stroke speed STS_FX according to the ON-OFF characteristic of the switch flag. Thus, the electric suspension device 11 based on the fourth aspect can determine which control mode to use between the first control mode and the second control mode more appropriately than the electric suspension devices 11 based on the first to third aspects with a simple configuration.

Also, an electric suspension device 11 based on a fifth aspect is the electric suspension device 11 based on the fourth aspect, and may be configured such that in a case where the determination unit 45 determines that a slip of the wheel has occurred while the orientation control unit 47 is performing the orientation control of the vehicle 10 based on the estimated stroke speed STS_ES, the orientation control unit 47 switches from the first control mode to the second control mode at a point when the determination is made.

According to the electric suspension device 11 based on the fifth aspect, in a case where the determination unit 45 determines that a slip of the wheel has occurred while the orientation control unit 47 is performing the orientation control of the vehicle 10 based on the estimated stroke speed STS_ES, the orientation control unit 47 switches from the first control mode to the second control mode at the point when the determination is made. Thus, as compared to the electric suspension device 11 based on the fourth aspect, the electric suspension device 11 based on the fifth aspect can quickly perform orientation control for maintaining the ride quality of the vehicle 10 comfortable even in a situation where the behavior of the vehicle 10 becomes unstable, such as when a slip of the wheel occurs. This makes it possible to further enhance the effect of maintaining the ride quality of the vehicle 10 comfortable.

Also, an electric suspension device 11 based on a sixth aspect is the electric suspension device 11 based on the fifth aspect, and may be configured such that in a case where the determination unit 45 determines that a slip of the wheel has stopped while the orientation control unit 47 is performing the orientation control of the vehicle 10 based on the fixed stroke speed STS_FX, the orientation control unit 47 switches from the second control mode to the first control mode at a point when the fixed value of the fixed stroke speed STS_FX and an estimated value of the estimated stroke speed STS_ES become equal to each other.

In the electric suspension device 11 based on the sixth aspect, in a case where the determination unit 45 determines that a slip of the wheel has stopped while the orientation control unit 47 is performing the orientation control of the vehicle 10 based on the fixed stroke speed STS_FX, the orientation control unit 47 switches from the second control mode to the first control mode at the point when the fixed value of the fixed stroke speed STS_FX and the estimated value of the estimated stroke speed STS_ES become equal to each other.

According to the electric suspension device 11 based on the sixth aspect, in a case where the determination unit 45 determines that a slip of the wheel has stopped while the orientation control unit 47 is performing the orientation control of the vehicle 10 based on the fixed stroke speed STS_FX, the orientation control unit 47 switches from the second control mode to the first control mode at the point when the fixed value of the fixed stroke speed STS_FX and the estimated value of the estimated stroke speed STS_ES become equal to each other. Thus, as compared to the electric suspension device 11 based on the fifth aspect, the electric suspension device 11 based on the sixth aspect can smoothly switch from the second control mode to the first control mode in a situation where a slip of the wheel disappears, without giving a sense of strangeness to an occupant in the vehicle 10. This makes it possible to even further enhance the effect of maintaining the ride quality of the vehicle 10 comfortable.

Also, an electric suspension device 11 based on a seventh aspect is the electric suspension devices 11 based on the first to sixth aspects, in which the estimation unit 43 further estimates a stroke position of the electromagnetic actuator 13. the orientation control unit 47 further has a function of comparing the estimated stroke position and a preset stroke end position with each other, and performing rebound shock control that generates a damping force for avoiding bump of the electromagnetic actuator 13, based on the sprung speed SV and a result of the comparison.

The orientation control unit 47 may be configured to inhibit or suppress the rebound shock control in a case where the determination unit 45 determines that a slip of the wheel has occurred.

In the electric suspension device 11 based on the seventh aspect, the orientation control unit 47 inhibits or suppresses the rebound shock control in a case where the determination unit 45 determines that a slip of the wheel has occurred. Thus, in a situation where the behavior of the vehicle 10 becomes unstable, such as when a slip of the wheel occurs, the rebound shock control based on the estimated stroke position, which may contain an error, is inhibited or suppressed.

According to the electric suspension device 11 based on the seventh aspect, in a situation where the behavior of the vehicle 10 becomes unstable, such as when a slip of the wheel occurs, the rebound shock control based on the estimated stroke position, which may contain an error, (the rebound shock control has a problem in accuracy) is inhibited or suppressed. Thus, as compared to the electric suspension devices 11 based on the first to sixth aspects, the electric suspension device 11 based on the seventh aspect can ensure that the rebound shock control is performed appropriately. This makes it possible to still further enhance the effect of maintaining the ride quality of the vehicle 10 comfortable.

Other Embodiments

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the electric suspension device 11 according to the present invention, the electromagnetic actuator 13 to which the rotational driving force of the electric motor 31 converted in the stroke direction is applied has been described as an example of the member corresponding to the actuator according to the present invention. However, the present invention is not limited to this example.

A publicly known mono-tube (de Carbon) adjustable damper as disclosed in, for example, Japanese Patent Application Publication 2015-47906 may be employed as the member corresponding to the actuator according to the present invention. This adjustable damper includes a circular cylinder filled with a magnetorheological fluid (MRF) and a piston rod inserted therein so as to be axially slidable. A piston mounted to the distal end of the piston rod partitions the inside of the cylinder into an upper oil chamber and a lower oil chamber. This piston is provided with a communication channel through which the upper oil chamber and the lower oil chamber communicate with each other, and a MLV coil located inside this communication channel.

Also, in the description of the electric suspension devices 11 according to the embodiments of the present invention, the information acquisition unit 41 has been described by exemplarily showing a configuration in which it acquires the rotational angle signal from the electric motor 31 detected by the resolver 37 as time-series information on the stroke position. However, the present invention is not limited to this example.

In the present invention, the estimation unit 43 may be configured to estimate the stroke speed STS and the stroke position of the electromagnetic actuator 13 based on the wheel speed WS acquired by the information acquisition unit 41. In this case, the resolver 37 can be omitted.

Figure 4B:
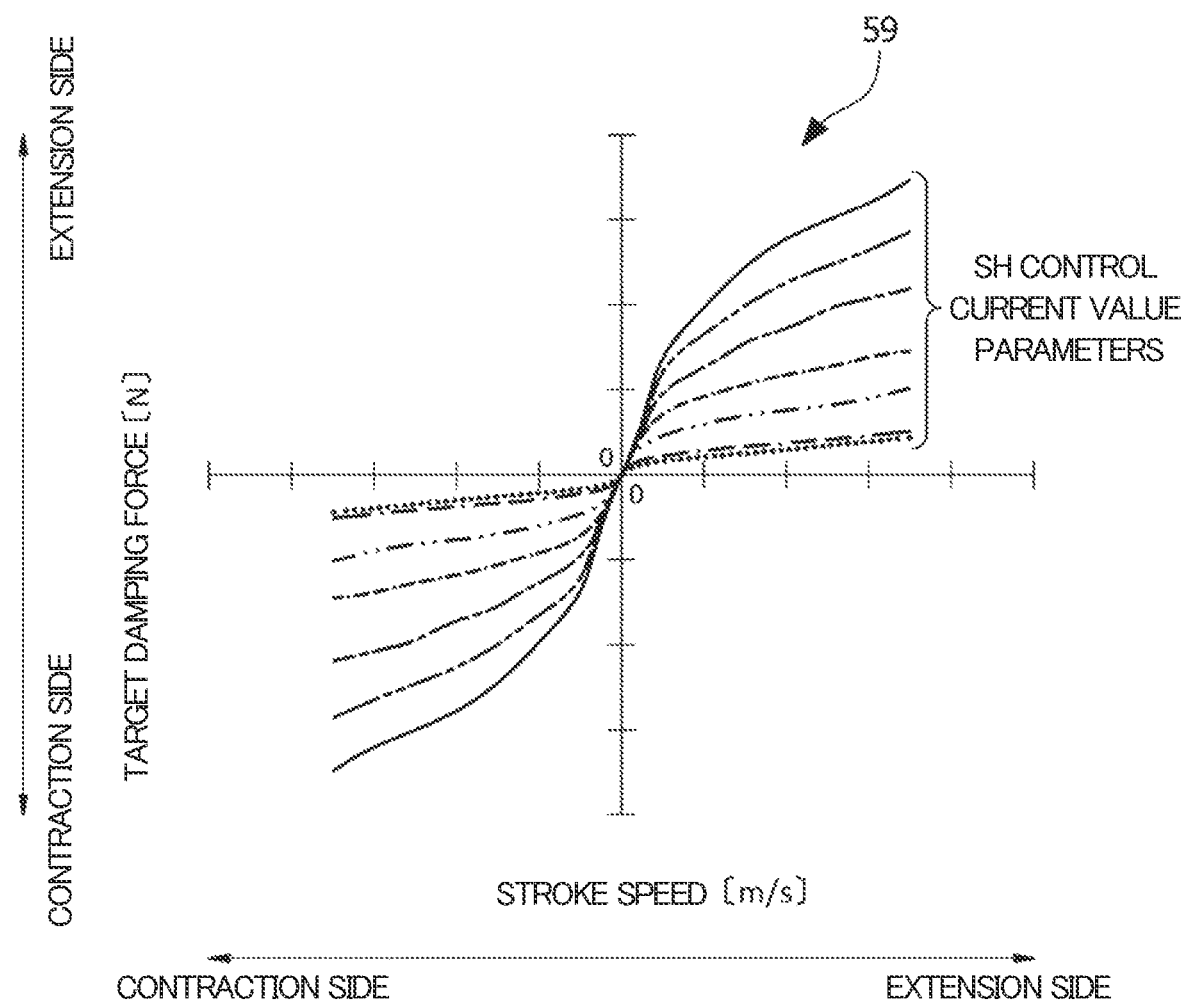
FIG. 4B is an explanatory diagram of a stroke speed-target damping force map conceptually indicating relations of damping force with stroke speed by using SH control current values as parameters.

Also, in the description of the electric suspension devices 11 according to the embodiments of the present invention, the relational characteristics in the stroke speed STS-target damping force map 59, in which relations of the target damping force with the stroke speed STS are each associated with a different SH control current parameter, have been described by taking the example illustrated in FIG. 4B. However, the present invention is not limited to this example.

In the present invention, the relational characteristics in the stroke speed STS-target damping force map 59 are not particularly limited. Necessary relational characteristics may be employed as appropriate.

Also, the electric suspension devices 11 according to the embodiments of the present invention have been described by taking an example in which a total of four electromagnetic actuators 13 are disposed for both the front wheels (front left wheel and front right wheel) and the rear wheels (rear left wheel and rear right wheel). However, the present invention is not limited to this example. A configuration in which a total of two electromagnetic actuators 13 are disposed for either the front wheels or the rear wheels may be employed.

Lastly, in the description of the electric suspension devices 11 according to the embodiments of the present invention, the orientation control unit 47 has been mentioned which controls the driving of the plurality of electromagnetic actuators 13 independently of each other.

Specifically, the orientation control unit 47 may control the driving of the electromagnetic actuators 13 provided for the four wheels independently on a wheel-by-wheel basis.

Alternatively, the orientation control unit 47 may control the driving of the electromagnetic actuators 13 provided for the four wheels such that the driving of the electromagnetic actuators 13 on the front wheels is controlled independently of that of the electromagnetic actuators 13 on the rear wheels or the driving of the electromagnetic actuators 13 on the left wheels is controlled independently of that of the electromagnetic actuators 13 on the right wheels.

What is claimed is:

1. An electric suspension device including an actuator that is provided between a body and a wheel of a vehicle and generates damping force for damping vibration of the body, the electric suspension device comprising a load control electronic control unit (ECU), wherein the load control ECU is configured to:
acquire information on each of a wheel speed and a sprung speed of the vehicle;
estimate a stroke speed of the actuator based on the wheel speed;
determine, based on a difference between a vehicle speed of the vehicle and the wheel speed, whether a slip of the wheel has occurred; and
perform orientation control of the vehicle based on the sprung speed and the estimated stroke speed,
wherein in a case where the slip of the wheel is determined to have occurred, perform orientation control of the vehicle based on a fixed stroke speed whose direction is the same as a direction of the sprung speed and whose magnitude is set at a predetermined fixed value, instead of the estimated stroke speed.

2. The electric suspension device according to claim 1, wherein the fixed value of the fixed stroke speed is set at a magnitude of a stroke speed before the determination that the slip of the wheel has occurred.

3. The electric suspension device according to claim 2, wherein in a case where the direction of the sprung speed inverts to a direction different from the direction of the fixed stroke speed while the orientation control of the vehicle is performed based on the fixed stroke speed, the orientation control of the vehicle is performed based on a fixed stroke speed whose direction is the same as the inverted direction and whose magnitude is set at the magnitude of the stroke speed before determination that the slip of the wheel has occurred.

4. The electric suspension device according to claim 1, wherein
- the load control ECU has a first control mode in which the orientation control of the vehicle is performed based on the estimated stroke speed and a second control mode in which the orientation control of the vehicle is performed based on the fixed stroke speed,
- the load control ECU includes a switch flag that indicates, with a binary value, a state indicating whether to execute the first control mode or to execute the second control mode,
- the switch flag has such an ON-OFF characteristic that, in a case where the determination that the slip of the wheel has occurred is made, the switch flag is turned on at a point when the determination is made, and is turned off after an elapse of a predetermined delay time from a point when a determination is made that the slip of the wheel has stopped, and
- the orientation control of the vehicle is performed based on the fixed stroke speed according to the ON-OFF characteristic of the switch flag.

5. The electric suspension device according to claim 4, wherein in a case where the determination that the slip of the wheel has occurred is made while the orientation control of the vehicle is performed based on the estimated stroke speed, the load control ECU switches from the first control mode to the second control mode at a point when the determination is made.

6. The electric suspension device according to claim 5, wherein in a case where the determination that the slip of the wheel has stopped is made while the orientation control of the vehicle is performed based on the fixed stroke speed, the load control ECU switches from the second control mode to the first control mode at a point when the fixed value of the fixed stroke speed and an estimated value of the estimated stroke speed become equal to each other.

7. The electric suspension device according to claim 1, Wherein
- the load control ECU further estimates a stroke position of the actuator,
- the load control ECU is further configured to compare the estimated stroke position and a preset stroke end position with each other, and perform rebound shock control that generates a damping force for avoiding bump of the actuator, based on the sprung speed and a result of the comparison, and
- the load control ECU inhibits or suppresses the rebound shock control in a case where it is determined that the slip of the wheel has occurred.

* * * * *